United States Patent
De Vrieze et al.

(10) Patent No.: US 12,346,666 B2
(45) Date of Patent: Jul. 1, 2025

(54) TRANSLATION REVIEW SUITABILITY ASSESSMENT

(71) Applicant: SDL Limited, Maidenhead (GB)

(72) Inventors: Erik De Vrieze, Leuven (BE); Viorel Daniel Sârbe, Cluj (RO); Giovanni Gallo, Madrid (ES)

(73) Assignee: SDL Limited, Maidenhead (GB)

( * ) Notice: Subject to any disclaimer, the term of this patent is extended or adjusted under 35 U.S.C. 154(b) by 240 days.

(21) Appl. No.: 17/984,203

(22) Filed: Nov. 9, 2022

(65) Prior Publication Data

US 2024/0152706 A1  May 9, 2024

(51) Int. Cl.
G06F 40/51 (2020.01)
G06F 40/58 (2020.01)
G06N 3/044 (2023.01)
G06N 3/08 (2023.01)

(52) U.S. Cl.
CPC .............. *G06F 40/51* (2020.01); *G06F 40/58* (2020.01); *G06N 3/044* (2023.01); *G06N 3/08* (2013.01)

(58) Field of Classification Search
CPC ........... G06F 40/51; G06F 40/58; G06F 40/47
See application file for complete search history.

(56) References Cited

U.S. PATENT DOCUMENTS

| | | | |
|---|---|---|---|
| 6,623,529 B1 | 9/2003 | Lakritz | |
| 7,207,005 B2 | 4/2007 | Lakritz | |
| 8,489,980 B2 | 7/2013 | Lakritz | |
| 10,255,277 B2 | 4/2019 | Zhang et al. | |
| 10,541,973 B2 | 1/2020 | Lakritz | |
| 10,740,558 B2 | 8/2020 | Ukrainets et al. | |
| 11,010,284 B1 | 5/2021 | Santiago et al. | |
| 11,361,170 B1 | 6/2022 | Shastry et al. | |

(Continued)

FOREIGN PATENT DOCUMENTS

| | | |
|---|---|---|
| EP | 3026614 A1 | 6/2016 |
| GB | 2558062 A | 7/2018 |

(Continued)

OTHER PUBLICATIONS

Carter et al., "Searching for Poor Quality Machine Translated Text: Learning the Difference between Human Writing and Machine Translations," Advances in Artificial Intelligence: 25th Canadian Conference on Artificial Intelligence, Canadian AI 2012, May 28-30, 2012, 12 pages.

(Continued)

*Primary Examiner* — Daniel C Washburn
*Assistant Examiner* — Paul J. Mueller
(74) *Attorney, Agent, or Firm* — Carr & Ferrell LLP

(57) ABSTRACT

A computer implemented method of and system for evaluating translations using a trained neural network. The inputs to the neural network for training and evaluating translations include a source content, translated content, source and target language identifier. Additional inputs for neural network training and evaluating translations can include translation origin before adaptation identifiers, file types, translator identifiers, customer identifiers, and content domain identifiers. The neural network outputs an indication that the translation is either correct or incorrect. Corrections by a reviewer or translator can be used in feedback for further training of the evaluation neural network.

20 Claims, 3 Drawing Sheets

(56) References Cited

U.S. PATENT DOCUMENTS

| | | | |
|---|---|---|---|
| 11,775,271 B1* | 10/2023 | Singh | G06N 3/08 |
| | | | 717/137 |
| 2007/0122792 A1 | 5/2007 | Galley et al. | |
| 2007/0233460 A1 | 10/2007 | Lancaster et al. | |
| 2008/0077395 A1 | 3/2008 | Lancaster et al. | |
| 2009/0240539 A1 | 9/2009 | Slawson et al. | |
| 2010/0223047 A1 | 9/2010 | Christ et al. | |
| 2010/0262621 A1* | 10/2010 | Ross | G06F 16/90344 |
| | | | 707/769 |
| 2011/0066469 A1 | 3/2011 | Kadosh | |
| 2011/0066556 A1 | 3/2011 | Kadosh | |
| 2011/0077934 A1 | 3/2011 | Kanevsky et al. | |
| 2011/0225104 A1 | 9/2011 | Soricut et al. | |
| 2011/0282795 A1 | 11/2011 | Kadosh | |
| 2012/0046934 A1 | 2/2012 | Cheng et al. | |
| 2012/0095747 A1 | 4/2012 | Ross et al. | |
| 2012/0197957 A1 | 8/2012 | de Voogd | |
| 2012/0221321 A1* | 8/2012 | Nakamura | G10L 15/32 |
| | | | 704/E13.001 |
| 2012/0265711 A1 | 10/2012 | Assche et al. | |
| 2013/0055074 A1 | 2/2013 | Trese et al. | |
| 2013/0067055 A1 | 3/2013 | Cheng et al. | |
| 2013/0124185 A1 | 5/2013 | Sarr et al. | |
| 2013/0262986 A1 | 10/2013 | Leblond et al. | |
| 2014/0006006 A1 | 1/2014 | Christ et al. | |
| 2014/0114642 A1 | 4/2014 | van den Oever et al. | |
| 2015/0154180 A1 | 6/2015 | Trese | |
| 2016/0162478 A1 | 6/2016 | Blassin et al. | |
| 2016/0328392 A1 | 11/2016 | Condie et al. | |
| 2017/0076199 A1* | 3/2017 | Zhang | G06F 40/45 |
| 2017/0124069 A1 | 5/2017 | Bondarchuk et al. | |
| 2018/0143975 A1 | 5/2018 | Casal et al. | |
| 2019/0042566 A1 | 2/2019 | Marcu et al. | |
| 2019/0147006 A1* | 5/2019 | Morris | G06F 16/958 |
| | | | 715/205 |
| 2019/0156817 A1* | 5/2019 | Li | G06N 3/044 |
| 2019/0197116 A1 | 6/2019 | Mad et al. | |
| 2019/0205396 A1* | 7/2019 | Gubanov | G06F 40/44 |
| 2020/0065341 A1* | 2/2020 | Reshadi | H04L 63/0428 |
| 2020/0089774 A1 | 3/2020 | Tu et al. | |
| 2020/0167529 A1 | 5/2020 | Bondarchuk et al. | |
| 2021/0019373 A1* | 1/2021 | Freitag | G06F 40/58 |
| 2021/0042475 A1 | 2/2021 | Zhang et al. | |
| 2021/0157991 A1* | 5/2021 | Wang | G06N 3/047 |
| 2021/0174033 A1 | 6/2021 | Xiong | |
| 2021/0194733 A1* | 6/2021 | Huangfu | G06N 3/084 |
| 2022/0198298 A1 | 6/2022 | Chow et al. | |
| 2023/0274102 A1* | 8/2023 | Marie | G06N 20/00 |
| | | | 704/2 |
| 2024/0127146 A1 | 4/2024 | Hardy et al. | |

FOREIGN PATENT DOCUMENTS

| | | |
|---|---|---|
| WO | WO2013148930 A1 | 10/2013 |
| WO | WO2019133506 A1 | 7/2019 |

OTHER PUBLICATIONS

Heinisch et al., "Attitudes of Professional Translators and Translation Students towards Order Management and 2 Translator Platforms." The Journal of Specialised Translation Issue 32 Jul. 2019, pp. 61-89.

* cited by examiner

TRANSLATION REVIEW SUITABILITY ASSESSMENT

CROSS-REFERENCE TO RELATED APPLICATION(S)

The present utility patent application is related to U.S. application Ser. No. 17/964,453, filed on Oct. 12, 2022, entitled "Translation Decision Assistant," which is incorporated herein by reference in its entirety for all purposes to the extent that such subject matter is not inconsistent herewith or limiting hereof.

FIELD

The present disclosure is directed to systems and methods of using machine learning and neural networks in the assessment of translated documents.

BACKGROUND

A professionally translated document typically requires the translated document to be reviewed by another skilled translator to check for errors and mistranslations. However, quite often only a small percentage of the words or sentences need correction or changing after a second review. One study showed that ninety percent of the sentences translated did not require correction. Thus, the second translation review is often a costly step where ninety percent of the review's time could be spending their time more efficiently.

A further attribute of professional translation is that the translation and the review is often a serial process adding time to the overall process. If the translation is needed quickly, this can be a problem. Spot checking a translated document is one approach to increasing the efficiency and speed of the reviewing translator. However, there is always the risk of the document having more errors or mistranslations than is indicated by the translated document.

What is needed are systems and methods for automatically reviewing a translated document. Such systems and methods are needed during translation or as part of a post-translation review so as to better utilize a reviewer's time.

SUMMARY

According to various embodiments, the present technology is directed to a computer implemented assessment of a translation.

The method starts with inputting into a trained evaluation neural network, a source segment content, a target segment content, a source language identifier, and a target language identifier. The neural network is trained with sentences of original text and translated sentences, and corrected sentences as training input into the neural network. Additionally, a source language identifier and target language identifier can be input into the neural network where the neural network is trained to handle multiple languages. Alternatively, different individually trained neural networks can be used for different language translations.

Additional inputs can be used to train the evaluation neural networks and to evaluate translations. The neural network can be trained with translation origin identifiers, translation origin before adaptation identifiers, file types, translator identifiers, customer identifiers, and content domain identifiers. In operation, the evaluation of a translation can also be input into the evaluation neural network, one or more of a translation origin identifier, a translation origin before adaptation identifier, a file type, a translator identifier, a customer identifier, and a content domain identifier for the source segment content being translated.

The output of the neural network can be a binary correct or incorrect indicator for each translated sentence that is input into the neural network. The input can be provided on a sentence by sentence basis, a block of sentences, or a complete document.

The evaluation neural network output can be aggregated into a distance label that is the sum of the incorrect sentences. Alternatively, the neural network can be part of a translation processing system where feedback is provided to a translator as each sentence is translated.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
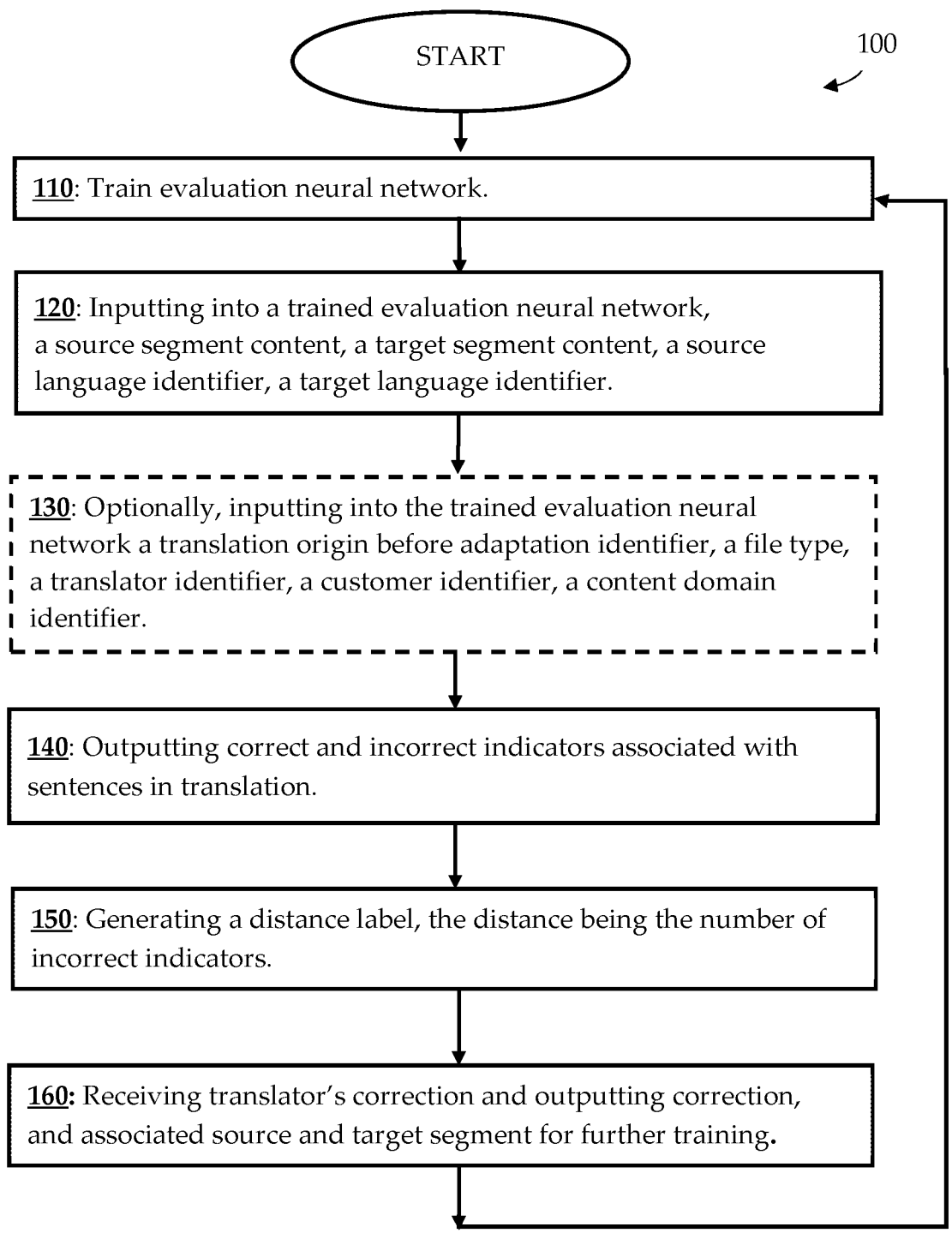
FIG. 1 is a flow chart showing an example method for evaluating a translation.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

One or more embodiments of the present disclosure include methods of and systems for reviewing a translation. There are multiple exemplar use cases for the system and method, but other use cases are contemplated and within the scope of the invention. One use case provides a prediction of whether a document segment or the entire document is unlikely to need a correction and does not need a reviewer's attention. A second use case is for using the system to help a translation manager make decisions about what type of review is needed. This could include a spot, full, or no review. Beneficially, the risk of making an incorrect decision is reduced by using the disclosed invention. A third use case for the system and method is to increase the effectiveness and usage of spot-check instead of full reviews. Sentences, paragraphs, or other segments where the translations that may have a mistake can be tagged for review instead of random samples being utilized. Beneficially, this type of reviewing is more effective than spot checking. In another use case, the system or method is utilized by the initial translator and thus enabling the initial translator to correct a mistake as they work.

These use cases can be implemented by, but not limited to, a hosted online service or created as a plugin for another program such as a Computer Aided Translation (CAT) tool.

The identified mistake can be made at different levels. At one level, a sentence with a mistake is identified as having a problem but the mistake can also be identified at a paragraph level or sub-sentence phrase level. In one embodiment, the method can include suggestions for a correction that can automatically be implemented to a corrected document. Alternatively, the suggested correction can be presented to a reviewer or original translator where the correction can be accepted, rejected, or an alternative correction made.

The term mistake can cover a variety of translation issues. A mistake can include a misspelling, a grammatical error, the wrong terminology, a style not matching the customer's requirements, or the tone of a sentence. At the highest level, a mistake can be any change required to meet a client's expectation.

In one embodiment, the system includes computer or special processor artificial intelligence (AI) that utilizes machine learning. The training of the AI (neural network) utilizes prior mistakes, which can include any or some of the prior changes, and the change that was made to resolve the mistake or change.

Data

The translation data can be referred to the source segment contents and the target segment contents. This data can include one or more sentences, paragraphs, or documents and tags associated with these sentences. The data is used by the translation evaluation system for evaluating a document, a paragraph, or document sentences for identifying translation mistakes. This data is used to train an AI machine learning, a neural network, system to make binary classifications of sentences as either correct or incorrect. Additionally, as the system is used, and further translations and corrections are made, these can be used to improve the neural network-based system. This neural network is referred to as the "trained evaluation neural network." Training data may be grouped by different types or combinations of types. The types can include but are not limited to document text data, document/segment/sentence formatting and tag information, the source language, the target language, translation origin, the file type, a translator's name or identifier, a customer's name or identifier, and a content domain.

The translation origin indicates whether a translation was created by a translator or was based on another translation or was from a machine translation. The content domain represents the business area or technical area from where the translation came. Examples of these include but are not limited to banking, medical, a medical specialty, science, a science specialty, and teaching.

The output of the system can be a binary decision on whether a segment has a mistake (needs review) or does not need review. The segment is typically a sentence but can be part of a sentence, a phrase, or a paragraph.

AI Training

In one embodiment, an AI neural network learning machine was trained and tested for translating English to Italian. The training utilized five hundred and forty thousand segments averaging 6.5 words per source segment and 7.3 words per target segment. The system was then tested and was found to be correct 99.2% of the time meaning that the model was correct 99.2% of the time that human review is not needed.

AI Model

The learning machine can utilize a deep neural network model to predict whether a segment (a translation) needs review. In one embodiment, the neural network model will predict "one" if the translation is incorrect and zero if otherwise. Potentially, the model can predict other values if multiple errors are detected.

Referring to FIG. 1, an embodiment of a method of reviewing a translation 100 is shown and described.

In step 110, a deep neural network is trained, the evaluation neural network. The inputs to train can include combinations of a source segment content, a target segment content, a source language identifier, a target language identifier and corrected target segment content. The source segment content can include the text, sentences, and documents to be translated. The target segment content is the text, sentence, or document that was translated. The corrected target segment content is the associated text, sentence, or document that was corrected by a reviewer. Preferably, the training occurs sentence by translated sentence and corrected sentence. Not requiring that all of the training requires a translated sentence and a corrected sentence is contemplated. Additionally, the evaluation neural network is trained with a code for the source language and the target language. These codes can be numbers or text strings.

Additional inputs can be used as part of the training of a translation evaluation neural network. These can include one or more of translation origin before adaptation identifiers, file types, translator identifiers, customer identifiers, and content domain identifiers. The translation origin identifier is whether the source segment was first translated by machine translation or from a previous translation. The file types include but are not limited to web content or document content. The translator identifiers are identifiers for each person who does translations. The translator identifier can be a number or a text string. The customer identifier is an identifier assigned to each customer. The customer identifier can be a numerical value or a text string. The content domain identifier identifies different types of documents or source segment content. The document types include but are not limited to banking, medical, a medical specialty, science, a science specialty, and teaching.

The evaluation neural network can include specific neural network structures that are better suited or more computationally efficient for evaluation of translations. These structures can include an embedded layer for source and target words, and associated translation and further long short-term memory to generate a representation of source and target sentences.

Note, that if separate neural networks are trained and used for either specific source and destination languages or domain identifiers, then these identifiers do not need to be used as an input in the training of the neural network or when evaluating translations.

In step 120, a source segment content, a target segment content, a source language identifier, and a target language identifier are input into evaluating the evaluation neural network. The target segment content can include tags and be a sentence, a paragraph, a block of text, or a complete document. The target segment content can also be a sentence, a paragraph, a block of text, or a complete document translation.

In step 130, the neural network can include additional inputs for the evaluation of the target segment context. These inputs can include one or more of a translation origin before adaptation identifier, a file type, a translator identifier, a customer identifier, and a content domain identifier. The evaluation neural network needs to be trained in step 110 with these included inputs.

In step 140, indicators are output for each sentence or phrase in the target segment content. The indicator can be binary or weighted and can contain a reference or association with each sentence. In one embodiment, each sentence that is incorrect is given the value of one and a correct sentence is given a zero. Correct means that the evaluation neural network does not determine that review of the sentence is indicated. Incorrect is an indication that the sentence should be reviewed.

In step 150, a distance label is generated. The distance is the number of incorrect indicators in target segment contents. The distance label can be used by a reviewer to decide if a document needs reviewing and where the reviewing should occur. Where an evaluation neural network is a plugin for a part of a Translation Workstation System or other translation software tool, the evaluation of translated sentences can be performed on a sentence by sentence basis where immediate feedback is given to a translator.

In step 160, optionally, sentences that are identified as incorrect, and that are corrected can be gathered or directly sent to step 110 for further training of the neural network. The retraining of the evaluation neural network can occur after receiving each correction or the corrections can be gathered for later retraining.

Figure 2:
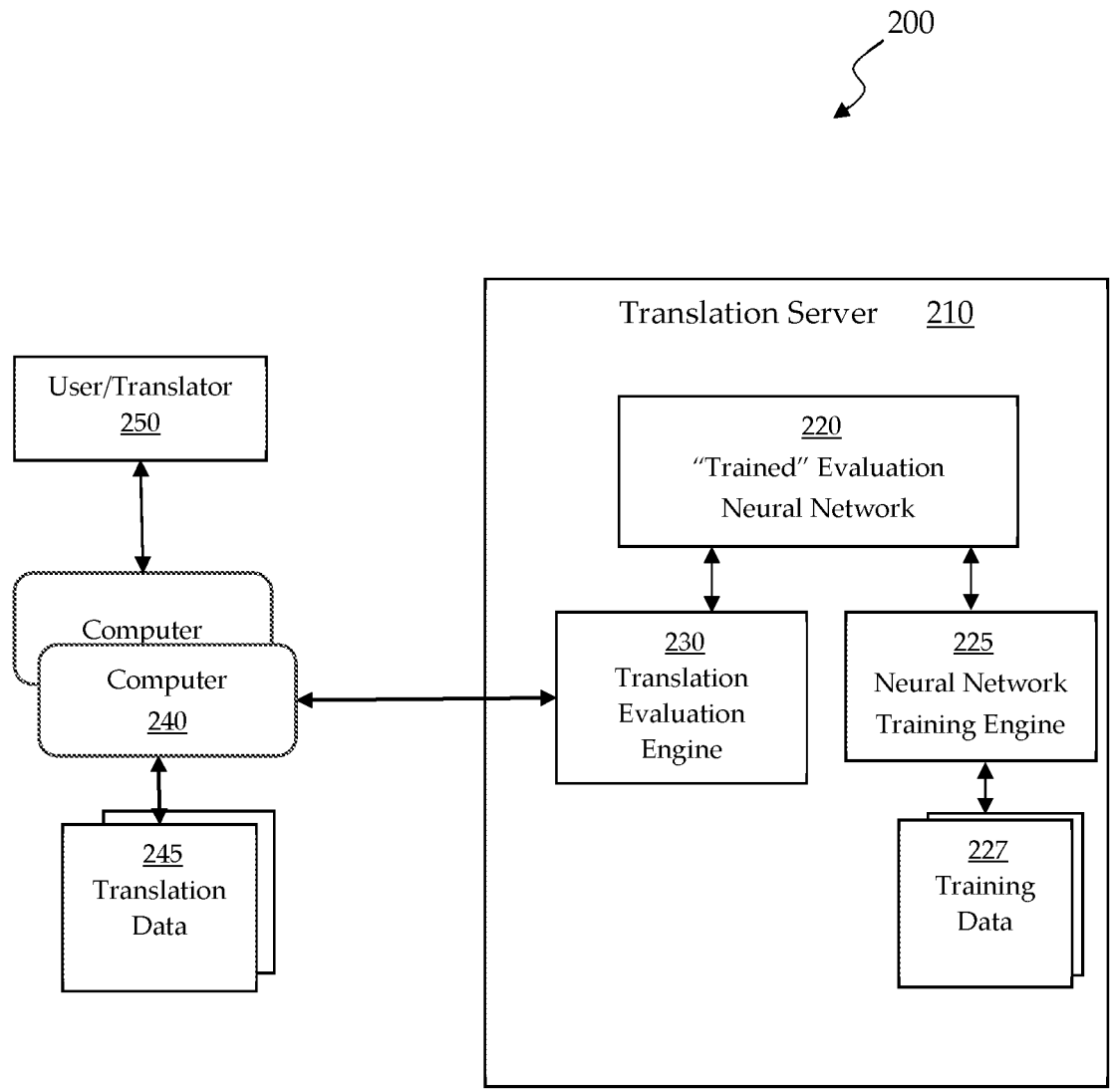
FIG. 2 is an example system for performing evaluations of translations.

Referring to FIG. 2, a system diagram 200 of a translation evaluation and assessment system is shown and described. The system 200 is comprised of a translation server 210 that provides translation services. Users/Translators or reviewers 250 access the translation services through a computer 240. The access can be through a direct connection, a wired or a wireless network. The user 250 can be a translator or a reviewer of translated documents.

The translation server 210 is comprised of an Evaluation Neural Network (Trained) 220, a Translation Evaluation Engine 230, a neural network training engine 225, and Training Data 227. These components include the software components to execute the method described above for FIG. 2.

Initially, the evaluation neural network 220 is trained under the control of the neural network training engine 225. The training engine 225 uses training data 227 which include many thousands of source segments, target segments, and corrected segments. This training data 227 can include additional information including one or more of source language identifiers, target language identifiers, translation origin before adaptation identifiers, file types, translator identifiers, customer identifiers, and content domain identifiers. A person of ordinary skill in data analytics and neural networks would know how to select and filter data for training a neural network.

In operation, one embodiment of the system the Translator 250 selects a document to translate. Through the computer 240, the translator selects a file from translation storage 245. This can be any type of storage including but not limited to attached disk drives and NAS (network attached storage). The translator 250 invokes the translation evaluation engine 230 which can be a plug-in on the translation server 210 or other software (not shown) or run on the computer 240. As each sentence is translated, the translated one or more sentences are sent to the evaluation neural network 220. Additional information regarding the translation is also sent to the evaluation neural network 220 including but not limited to source language identifiers, target language identifiers, translation origin before adaptation identifiers, file types, translator identifiers, customer identifiers, and content domain identifiers. The evaluation neural network 220 returns an indication that the sentence or phrase just translated is correct or incorrect. The user/translator 250 receives this indication and has immediate feedback on the translation. Optionally, when there is an error in translation, the source sentence, target sentence that was in error, and the corrected sentence can be sent to the neural network training engine to be stored as training data 227 and used to further train the evaluation neural network 220.

In another embodiment of the system, the user 250 who is a reviewer of the translator's end product receives a translated document. The reviewer 250 selects this document and sends it through the translation evaluation engine 230 and receives back from the evaluation neural network 220 a label distance. The label distance relates to the number of sentences that are found to be incorrect by the neural network 220. This distance can be normalized by the number of sentences reviewed. Additionally, a link or other identifier for each specific sentence that is identified as incorrect can be returned to the reviewer 250. The reviewer can quickly use this information to determine if the document needs a second review.

Figure 3:
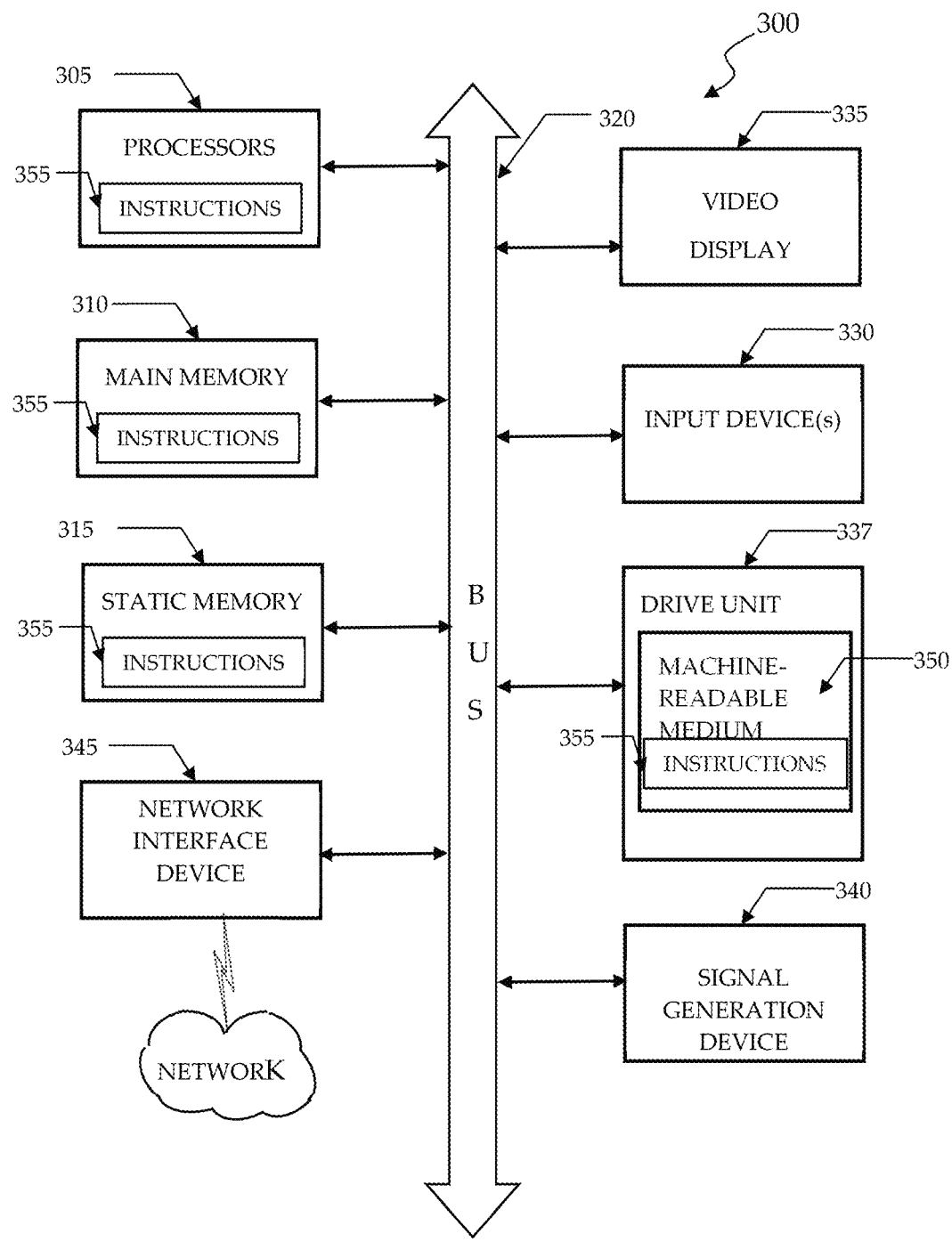
FIG. 3 is a schematic diagram of an example computer device that can be utilized to implement aspects of the present technology.

The components provided in the computer system 300 of FIG. 3 are those typically found in computer systems that may be suitable for use with embodiments of the present disclosure and are intended to represent a broad category of such computer components that are well known in the art. Thus, the computer system 300 of FIG. 3 can be a personal computer (PC), workstation, server, minicomputer, mainframe computer, computer server, or any other computer system. The computer may also include different bus configurations, networked platforms, multi-processor platforms, and the like. Various operating systems may be used including UNIX, LINUX, WINDOWS, MAC OS, ANDROID, IOS, CHROME, TIZEN and other suitable operating systems.

The processing for various embodiments may be implemented in software that is cloud-based. The computer system 300 may be implemented as a cloud-based computing environment. In other embodiments, the computer system 300 may itself include a cloud-based computing environment. Thus, the computer system 300, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices.

The cloud may be formed, for example, by a network of web servers that comprise a plurality of computing devices, such as the computer system 300, with each server (or at least a plurality thereof) providing processor and/or storage resources. These servers may manage workloads provided by multiple users (e.g., cloud resource customers or other users).

FIG. 3 is a diagrammatic representation of an example machine in the form of a computer system 300, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be, for example, a base station, a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processor or multiple processors 305 (e.g., a central processing unit (CPU), a graphics processing unit (GPU), Digital Signal Processor, Neural Processor Unit (NPU) or any combination thereof), and a main memory 310 and static memory 315, which communicate with each other via a bus 320. The computer system 300 may further include a video display 335 (e.g., a liquid crystal display (LCD)). The computer system 300 may also include an alpha-numeric input device(s) 330 (e.g., a keyboard), a cursor control device (e.g., a mouse), a voice recognition or biometric verification unit (not shown), a drive unit 337 (also referred to as disk drive unit), a signal generation device 340 (e.g., a speaker), and a network interface device 345. The computer system 300 may further include a data encryption module (not shown) to encrypt data.

The drive unit 337 includes a computer or machine-readable medium 350 on which is stored one or more sets of instructions and data structures (e.g., instructions 355) embodying or utilizing any one or more of the methodologies or functions described herein. The instructions 355 may also reside, completely or at least partially, within the main memory 310 and/or within static memory 315 and/or within the processors 305 during execution thereof by the computer system 300. The main memory 310, static memory 315, and the processors 305 may also constitute machine-readable media.

The instructions 355 may further be transmitted or received over a network via the network interface device 345 utilizing any one of a number of well-known transfer protocols (e.g., Hyper Text Transfer Protocol (HTTP)). While the machine-readable medium 350 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 300 are required and thus portions of the computer system 300 can be removed if not needed, such as Input/Output (I/O) devices (e.g., input device(s) 330). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, section, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purposes only and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method of evaluating a segment translation, performed by one or more computer-based machines, comprising:

receiving, by a translation server associated with the one or more computer-based machines, training data to train an evaluation neural network, the translation server configured for providing translation services, the translation server comprising the evaluation neural network and a neural network training engine;

initially training the evaluation neural network by using the training data, the initial training being controlled by the neural network training engine and resulting in a trained evaluation neural network, the evaluation neural network being trained with the training data comprising:

source segments, target segments, corrected segments, translation origin before adaptation identifiers indicating whether one or more of the source segments were first translated using a machine translation or from a previous translation, and additional information comprising one or more of source language identifiers, target language identifiers, file types, translator identifiers, customer identifiers, and content domain identifiers;

inputting into the trained evaluation neural network of the translation server, a source segment content, a target segment content having one or more sentences, a source language identifier, and a target language identifier; and outputting, by the trained evaluation neural network of the translation server, one or more binary indicators associated with each of the one or more sentences within the target segment content, the one or more binary indicators being a correct indicator or an incorrect indicator of the target segment content.

2. The method of claim 1, wherein the trained evaluation neural network includes an embedded layer for source and target words, and associated translation and further long short-term memory to generate a representation of source and target sentences.

3. The method of claim 1, further comprising:
generating a distance label, wherein the target segment content is comprised of one or more translated sentences and the one or more binary indicators are associated with the one or more translated sentences, the distance label being a number of sentences with an associated one or more binary indicators indicating an incorrect indicator.

4. The method of claim 1, wherein the target segment content is a single translated sentence, and the trained evaluation neural network evaluates the single translated sentence and outputs either the incorrect indicator or the correct indicator to one of an integrated translation system or a user display device.

5. The method of claim 1, wherein a content domain identifier includes one or more of a banking, medical, a medical specialty, science, a science specialty, teaching, technical, academic, and business.

6. The method of claim 1, wherein the trained evaluation neural network is a separately trained evaluation neural network for each source language identifier and target language identifier.

7. The method of claim 1, wherein a part of the evaluation neural network is executed on a neural network processor chip.

8. The method of claim 1, further comprising:
receiving, from a user, a modified translated sentence associated with a sentence in a target segment; and
training the trained evaluation neural network with the modified translated sentence and the associated sentence in the target segment.

9. The method of claim 1, further comprising:
receiving sentences that are identified as incorrect;
receiving sentences that were corrected; and
further training of the trained evaluation neural network with one or more of the received sentences that are identified as incorrect and one or more of the received sentences that were corrected.

10. The method of claim 1, wherein the file types comprise web content or a document content, and the customer identifiers are identifiers assigned to customers, the customer identifiers being numerical values or text strings.

11. A system for evaluating a segment translation, comprising:
one or more hardware processors configured by machine-readable instructions to:

receive, by a translation server associated with one or more computer-based machines, training data to train an evaluation neural network, the translation server configured for providing translation services, the translation server comprising the evaluation neural network and a neural network training engine;

initially train the evaluation neural network by using the training data, the initial training being controlled by the neural network training engine and resulting in a trained evaluation neural network, the evaluation neural network being trained with the training data comprising:
source segments,
target segments,
corrected segments,
translation origin before adaptation identifiers indicating whether one or more of the source segments were first translated using a machine translation or from a previous translation, and
additional information comprising one or more of source language identifiers, target language identifiers, file types, translator identifiers, customer identifiers, and content domain identifiers;

input into the trained evaluation neural network of the translation server a source segment content, a target segment content having one or more sentences, a source language identifier, and a target language identifier; and output, by the trained evaluation neural network of the translation server, one or more binary indicators associated with each of the one or more sentences within the target segment content, the one or more binary indicators being a correct indicator or an incorrect indicator of the target segment content.

12. The system of claim 11, wherein the trained evaluation neural network includes an embedded layer for source and target words, and associated translation and further long short-term memory to generate a representation of source and target sentences.

13. The system of claim 11, further comprising:
generation of a distance label, wherein the target segment content is comprised of one or more translated sentences and the one or more binary indicators are associated with the one or more translated sentences, the distance label being a number of sentences associated with the one or more binary indicators indicating an incorrect indicator.

14. The system of claim 11, wherein the target segment content is a single translated sentence, and the trained evaluation neural network evaluates the single translated sentence and outputs either the incorrect indicator or the correct indicator to one of an integrated translation system or a user display device.

15. The system of claim 11, wherein a content domain identifier is one of a banking, medical, a medical specialty, science, a science specialty, teaching, technical, academic, and business.

16. The system of claim 11, wherein the trained evaluation neural network is a separately trained evaluation neural network for each network for each source language identifier, target language identifier and content domain identifier.

17. The system of claim 11, wherein a part of the evaluation neural network is executed on a neural network processor chip.

18. The system of claim 11, wherein the trained evaluation neural network is separately trained for each content domain identifier, each content domain identifier being configured to identify different types of documents or source segment content.

19. The system of claim 11, wherein the one or more hardware processors are further configured by the machine-readable instructions to:
   receive sentences that are identified as incorrect;
   receive sentences that were corrected; and
   further train the trained evaluation neural network with one or more of the received sentences that are identified as incorrect and one or more of the received sentences that were corrected.

20. The system of claim 11, wherein the file types comprise web content or a document content, and the customer identifiers are identifiers assigned to customers, the customer identifiers being numerical values or text strings.

* * * * *

UNITED STATES PATENT AND TRADEMARK OFFICE
CERTIFICATE OF CORRECTION

PATENT NO. : 12,346,666 B2
APPLICATION NO. : 17/984203
DATED : July 1, 2025
INVENTOR(S) : Erik De Vrieze, Viorel Daniel Sârbe and Giovanni Gallo Page 1 of 1

It is certified that error appears in the above-identified patent and that said Letters Patent is hereby corrected as shown below:

In the Specification

In Column 4 Line 65, the phrase "evaluating the evaluation" should read "the evaluation".

Signed and Sealed this
Thirtieth Day of December, 2025

John A. Squires
*Director of the United States Patent and Trademark Office*